(12) United States Patent
Mayfield et al.

(10) Patent No.: US 7,029,199 B2
(45) Date of Patent: Apr. 18, 2006

(54) AUTOMATIC GROUND MARKING METHOD AND APPARATUS

(75) Inventors: Ian Mayfield, Queensland (AU); Matthew J Johnson, Queensland (AU)

(73) Assignee: Edgeroi Pty. Ltd., Queensland (AU)

( * ) Notice: Subject to any disclaimer, the term of this patent is extended or adjusted under 35 U.S.C. 154(b) by 0 days.

(21) Appl. No.: 10/669,555

(22) Filed: Sep. 25, 2003

(65) Prior Publication Data
US 2004/0057795 A1 Mar. 25, 2004

Related U.S. Application Data

(63) Continuation of application No. PCT/AU02/00357, filed on Mar. 25, 2002.

(30) Foreign Application Priority Data
Mar. 26, 2001 (AU) .................................. PR3965

(51) Int. Cl.
*E01C 23/07* (2006.01)
(52) U.S. Cl. ..................... 404/84.05; 404/93
(58) Field of Classification Search ............ 404/84.05, 404/84.1, 84.2, 93, 94
See application file for complete search history.

(56) References Cited

U.S. PATENT DOCUMENTS

| 4,677,555 A * | 6/1987 | Goyet .......................... 701/50 |
| 4,691,445 A * | 9/1987 | Fields, Jr. ..................... 33/367 |
| 5,529,432 A * | 6/1996 | Huynh et al. ............. 404/84.05 |
| 5,540,516 A | 7/1996 | Nicodemo et al. |
| 5,540,518 A * | 7/1996 | Wambold ................ 404/84.05 |
| 5,549,412 A * | 8/1996 | Malone ..................... 404/84.1 |
| 5,838,277 A * | 11/1998 | Loomis et al. ......... 342/357.13 |
| 6,074,693 A * | 6/2000 | Manning ..................... 427/137 |
| 6,171,018 B1 * | 1/2001 | Ohtomo et al. ............ 404/84.5 |
| 6,208,916 B1 * | 3/2001 | Hori ............................. 701/28 |
| 6,299,934 B1 * | 10/2001 | Manning ..................... 427/137 |
| 6,371,566 B1 * | 4/2002 | Haehn ........................ 299/1.5 |
| 6,505,406 B1 * | 1/2003 | Robertson et al. ........... 33/1 G |
| 6,530,720 B1 * | 3/2003 | Green ....................... 404/84.1 |
| 6,821,052 B1 * | 11/2004 | Zurn ......................... 404/84.5 |

FOREIGN PATENT DOCUMENTS

| GB | 2 164 376 | 3/1986 |
| GB | 2266863 | 11/1993 |
| WO | WO 97/18021 | 5/1997 |

OTHER PUBLICATIONS

Form PCT/IB/306 (Notification of the Recording of a Change) (PCT/AU02/00357).

(Continued)

*Primary Examiner*—Gary S. Hartmann
(74) *Attorney, Agent, or Firm*—Smith, Gambrell & Russell

(57) ABSTRACT

An automatic ground marking apparatus including a carriage (1) responsive to carriage control signals for traversing the ground (5), the carriage having a controllable steering and drive system, a controllable marking system and a position determining system (6) arranged to determine the position of the carriage. The ground marking apparatus further includes a processor (8) responsive to the position determining system and operatively executing a software product for generating the carriage control signals to cause the carriage (1) to mark out a predetermined sign (14) on the ground. The position determining system (6) suitably employs a laser beam (4) and reflective tracking prism (2), and the predetermined sign may be defined by data points stored in a file (9) accessed by the processor (8) (FIG. 1).

12 Claims, 5 Drawing Sheets

OTHER PUBLICATIONS

Form PCT/IPEA/401 (PCT Demand) (PCT/AU02/00357).
Form PCT/IPEA/409 (International Preliminary Examination Report) (PCT/AU02/00357) with replacement pages presented during the International stage.
Form PCT/ISA/210 (International Search Report) (PCT/AU02/00357).

Derwent Abstract Accession No. 96-110641/12, Class Q41, JP 08010379 A (Nippon Koku Densi II Kogyo KK) Jan. 16, 1996 - Abstract.
Derwent Abstract Accession No. 96-203451/21, Class P36, JP 08071201 A (Pilot Corp) Mar. 19, 1996 - Abstract.

* cited by examiner

AUTOMATIC GROUND MARKING METHOD AND APPARATUS

This application is a continuation of prior application No. PCT/AU02/00357, Mar. 25, 2002.

BACKGROUND OF THE INVENTION

1. Field of the Invention

The present invention relates to an apparatus and method for making markings on ground surfaces such as turf playing fields and fairways. The invention has particular although not exclusive application where there is a need to automatically produce signs, such as logos or advertisements for example, on large ground surfaces whether even, sloped or undulating.

2. Discussion of the Background Art

A variety of arrangements for marking turf, such as the turf of playing fields, are known in the prior art. The simplest turf marking involves the application of straight lines to demarcate playing field boundaries. Commercially available line marking machines are used to facilitate such marking. Such machines may include a line of sight guide to aid the operator in producing a straight line between two reference points. Line marking machines are not suitable for producing complex signs or logos on turf.

Over the last two decades there has been a trend to mark playing fields with signs such as corporate logos or advertisements. High profile sporting events attract large crowds and television coverage so that turf advertisements are effective as such events are viewed by a large audience.

One way in which signs have traditionally been produced on turf has been with the help of stencils having apertures through which paint is sprayed or otherwise applied. The production and application of stencils for creating complex and large turf markings is time consuming and prone to error.

The surface of grounds such as sporting fields typically include variations in surface level, such as for drainage purposes. These variations can vary from tens of centimetres and upwards across conventional sporting fields. Large variations or undulations can cause distortion of logos and possibly affect viewing by spectators. On a golf course there are deliberate variations and undulations in ground surfaces, which exacerbate problems with application and viewing of ground markings. Hitherto it has not been widely known to automatically apply complex markings to ground surfaces, especially to turf which is non-planar, undulating or uneven, since neither of the previously discussed approaches to the generation of turf markings are particularly suited to application on a non-planar or sloping surface.

SUMMARY OF THE INVENTION

Object of the Invention

It is an object of the present invention to provide methods and apparatus that are an improvement over presently available methods and apparatus for marking ground surfaces with designs such as corporate logos.

It is an object of certain embodiments of the invention to provide methods and apparatus for automatically and efficiently marking level/even or undulating/uneven turf with complex patterns or logos.

Disclosure of the Invention

According to a first aspect of the invention there is provided an automatic ground marking apparatus including:

a carriage responsive to carriage control signals for traversing the ground, the carriage having a controllable steering and drive system and a controllable marking system;

a position determining system arranged to determine the position of the carriage; and a processor responsive to the position determining system and operatively executing a software product for generating said carriage control signals wherein the controllable steering and drive system respond to said carriage control signals to cause the carriage to traverse the ground and mark out a predetermined sign on the ground.

In the present specification, the term "position" includes position of an object in three dimensional (3D) space, including the latitude, longitude and height of the object relative to a predetermined point of reference.

If required, the carriage control signals are transmitted to the carriage from a remote processor, which processor is associated with points defining the predetermined sign.

Preferably the position determining system comprises a laser based electronic distance measuring system including a base station and a reflector.

In one embodiment the base station is mounted to the carriage. In this embodiment the processor is also mounted to the carriage and connected to receive position data from the base station.

In an alternative embodiment the base station is fixed to the ground and the reflector is mounted to the carriage.

In that event the processor is connected to receive position data from the base station, the marking system further including a radio link to relay carriage control signals to the carriage.

The controllable steering and drive system may incorporate an on-board compass with further processing apparatus responsive to the compass and arranged to determine an actual bearing of the carriage.

Preferably the further processing apparatus compares the actual bearing with a desired bearing encoded in the guidance signals transmitted.

The desired bearing is typically generated by the carriage guidance system.

As an alternative to the laser based electronic distance measuring system, the carriage guidance system may instead include a GPS receiver.

Preferably the controllable marking system includes a reservoir for a marking medium, such as paint, and a dispensing nozzle. A controllable valve may interconnect the reservoir and dispensing nozzle.

The controllable steering and drive system may include a number of independently controllable drive units each coupled to a corresponding wheel of the carriage.

The carriage may further include a feedback sensor arranged to provide a feedback signal to the processor.

The feedback sensor may be a shaft encoder, an inclinometer or a compass.

Where the processor is located external of the carriage, a convenient way in which the feedback signal may be relayed to the processor is by means of a radio link.

According to a further aspect of the present invention there is provided a computer software product stored on a computer readable memory and executable by a processor for causing a carriage including a controllable steering and drive system and a controllable marking system to mark out a sign the software product including:

carriage position instructions for reading a carriage position from a data stream generated by a position sensing device;

sign point instructions for reading a file of points defining a predetermined sign;

command instructions for generating commands to cause a carriage to traverse the ground surface and dispense paint on the surface in order to mark out said sign.

In another aspect of the present invention there is provided a method for surveying an area by means of an automated carriage arranged to move over a predetermined path, the method comprising the steps of:

initiating movement of the carriage over the path;
monitoring the position of the carriage; and
recording position coordinates of the carriage in a computer file.

Preferably the step of monitoring the position of the carriage is achieved by means of an EDM system at a remote site, wherein a reflective portion of said system is mounted on the carriage and wherein the base station of the EDM system is at least part of the remote site. Alternatively, the EDM system may be on-board the carriage and arranged for interaction with remote reflectors.

BRIEF DETAILS OF THE DRAWINGS

In order that this invention may be readily understood and put into practical effect, reference will be made to the accompanying drawings wherein.

DESCRIPTION OF PREFERRED EMBODIMENTS

Figure 1:
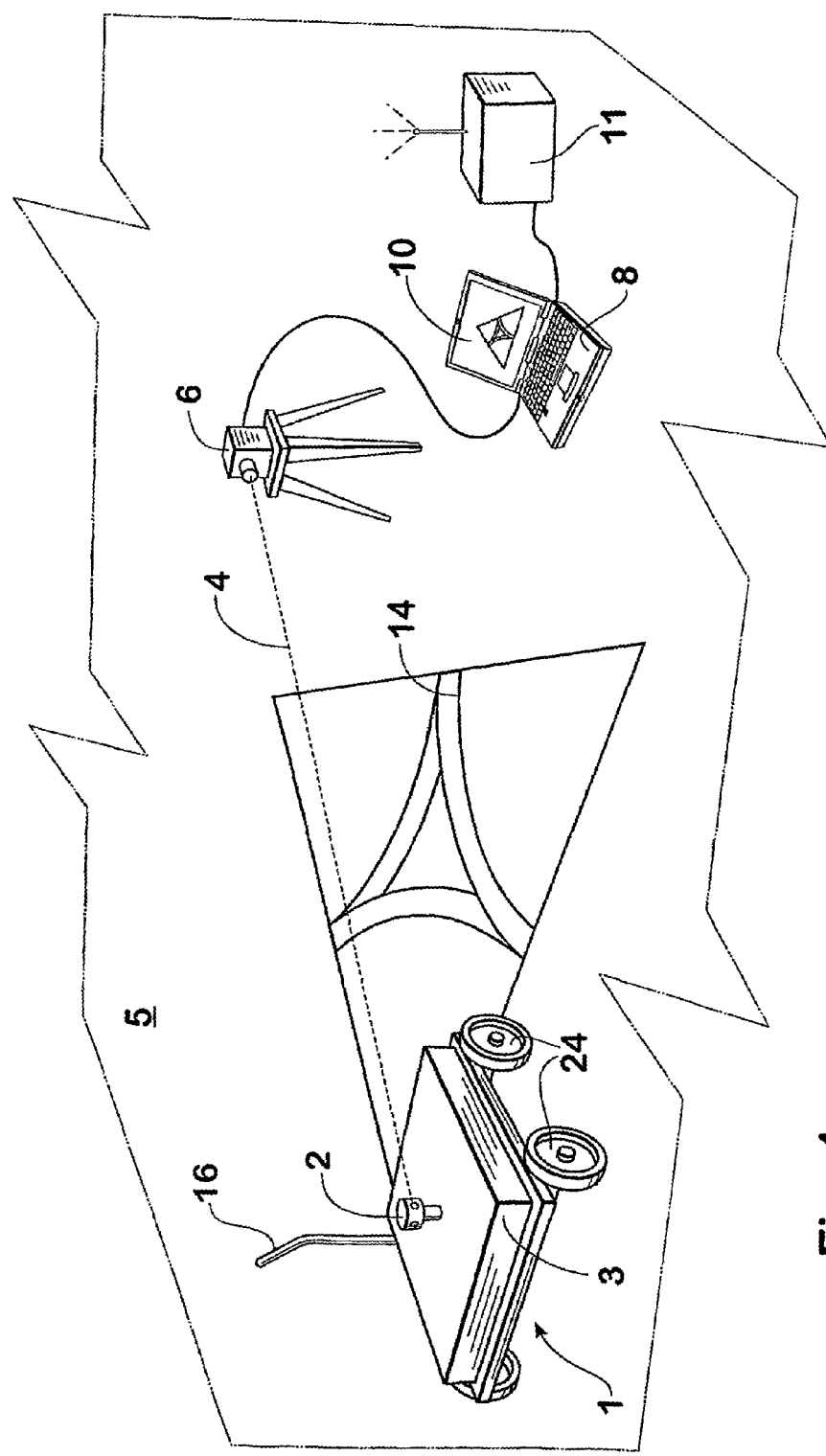
FIG. 1 depicts an automated turf-marking carriage according to one embodiment of the present invention.

A preferred embodiment of an automatic turf marking system of the invention will be described in overview with reference to FIG. 1. A manoeuvrable paint dispensing carriage 1 for traversing the ground 5 includes a reflective tracking prism 2. A cover 3 covers the internal components of the carriage. An electronic distance measuring (EDM) base station 6 tracks the location of the carriage 1 by reflecting a laser beam 4 off the tracking prism. The base station 6 and prism 2 may be obtained as components of an AP-I1A auto-tracking electronic distance measuring system available from Topcon America Corporation of 37 West Century Road, Paramus, N.J. 07652, USA.

A lap-top computer 8 is coupled to a digital position data port on the base station 6. As will be explained, the computer 8 includes a processor that executes a software product that compares position data from the base station with a pre-stored data file. The data file contains coordinate points defining a desired sign or logo to be applied to the turf. The software product may be configured to cause the computer 8 to display the desired logo on a display screen 10. Under control of the software product, the processor generates a series of steering and paint dispensing instructions that are output to a radio transmitter 11. The radio transmitter 11 transmits corresponding radio control signals to the carriage 1 for reception by an antenna 16. The carriage receives the radio control signals and moves and releases paint in accordance with the control signals in order to mark out turf logo 14.

It is not necessary for the entire turf logo to be marked out by carriage 1. For example the software program may be configured so that the carriage marks out a number of points sufficient for a manual operator to complete the turf logo by hand. In the presently described embodiment, the EDM base station 6, processor (in the form of the lap-top computer 8) and transmitter form a carriage guidance or position determining system. Although the EDM base station is coupled to the lap-top computer by a cable link in the drawings, it will be appreciated that the base station may be remotely controlled using radio link therebetween.

Figure 2:
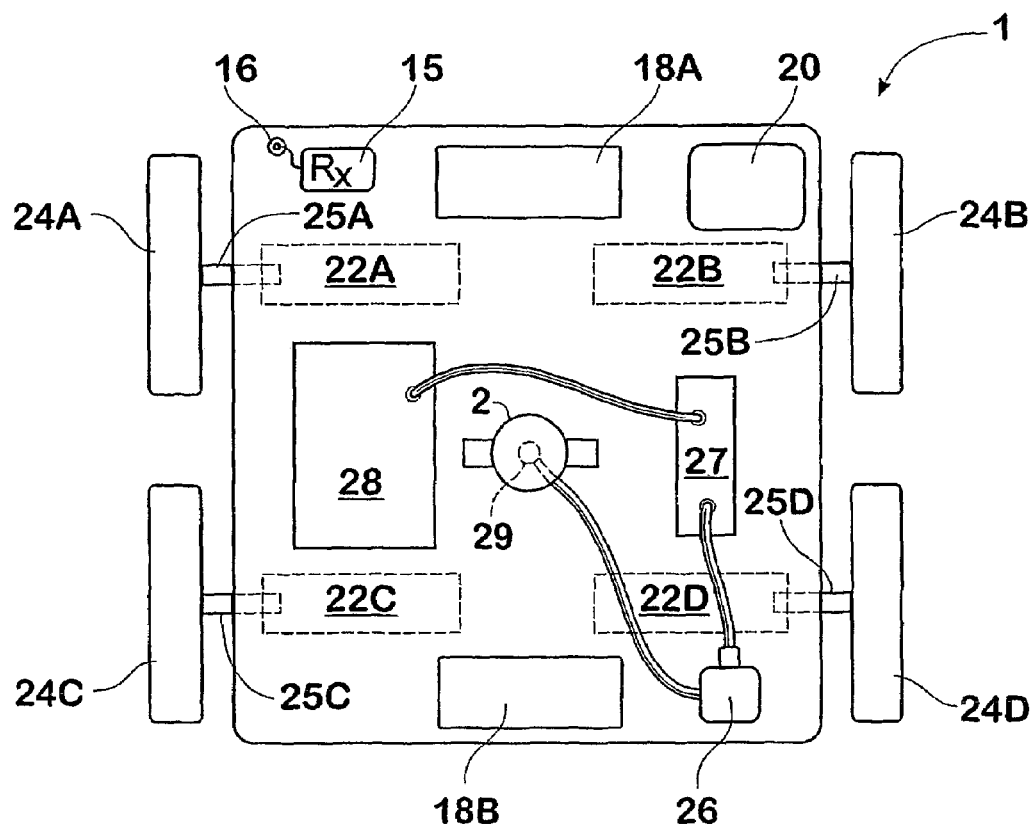
FIG. 2 is a top plan view of the layout of the carriage of FIG. 1 with top cover removed.

Referring now to FIG. 2 there is depicted a plan view of the module layout of carriage 1 with cover 3 removed. The carriage includes an antenna 16 coupled to a receiver 15 which in turn is coupled to a control module 20. Also included are batteries 18A, 18B which provide power for the receiver 15, the control module 20, drive and steering modules 22A–22D, a pump 27 and a solenoid actuated valve 26.

The control module sends command signals to drive and steering modules 22A–22D each of which are coupled to wheels 24A–24D respectively by axle shafts 25A–25D. As will be explained, shaft encoders may be employed to confirm that the steering and drive command signals are accurately carried out. The control module 20 also sends commands to solenoid actuated valve 26 in order to control the dispensing of paint through nozzle 29 onto turf 5 beneath the carriage 1.

Figure 3:
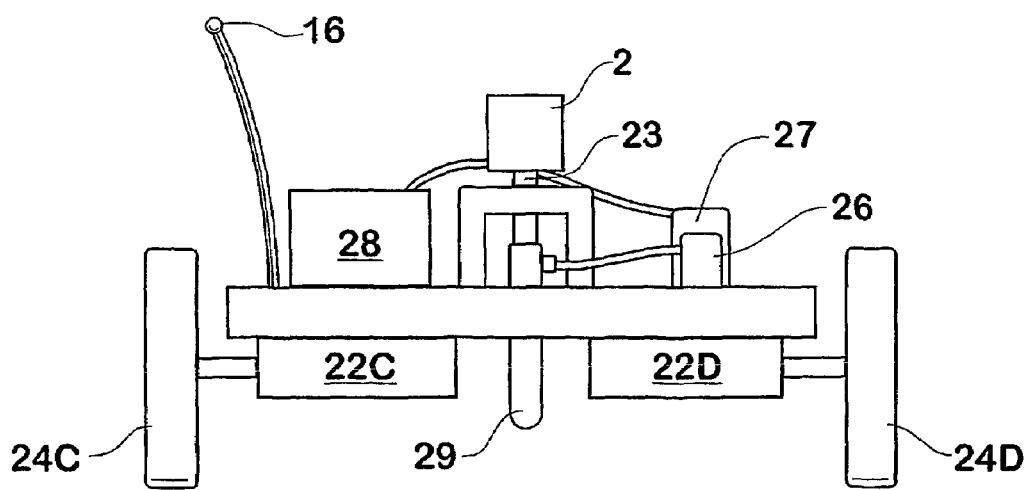
FIG. 3 is a rear elevational view of the carriage of FIG. 2.

FIG. 3 is a rear view of the carriage of FIG. 2 viewed along arrow A, with battery 18B removed. In another embodiment of the invention, the tracking prism 2 and dispenser nozzle 29 may be mounted on a gimbal structure whereby the prism may be maintained vertically above the nozzle, even when the carriage is required to traverse an inclined surface, such as that illustrated in FIG. 7. This arrangement facilitates use of a taller mast 23 for carrying the tracking prism 2, better suited to operation of the carriage 1 on sloping or undulating surfaces. If required, an inclinometer may be employed on the carriage. The inclinometer may be used either to automatically maintain the mast in a vertical orientation, or to transmit inclination data to the processor for real-time compensation of carriage inclination.

Figure 4:
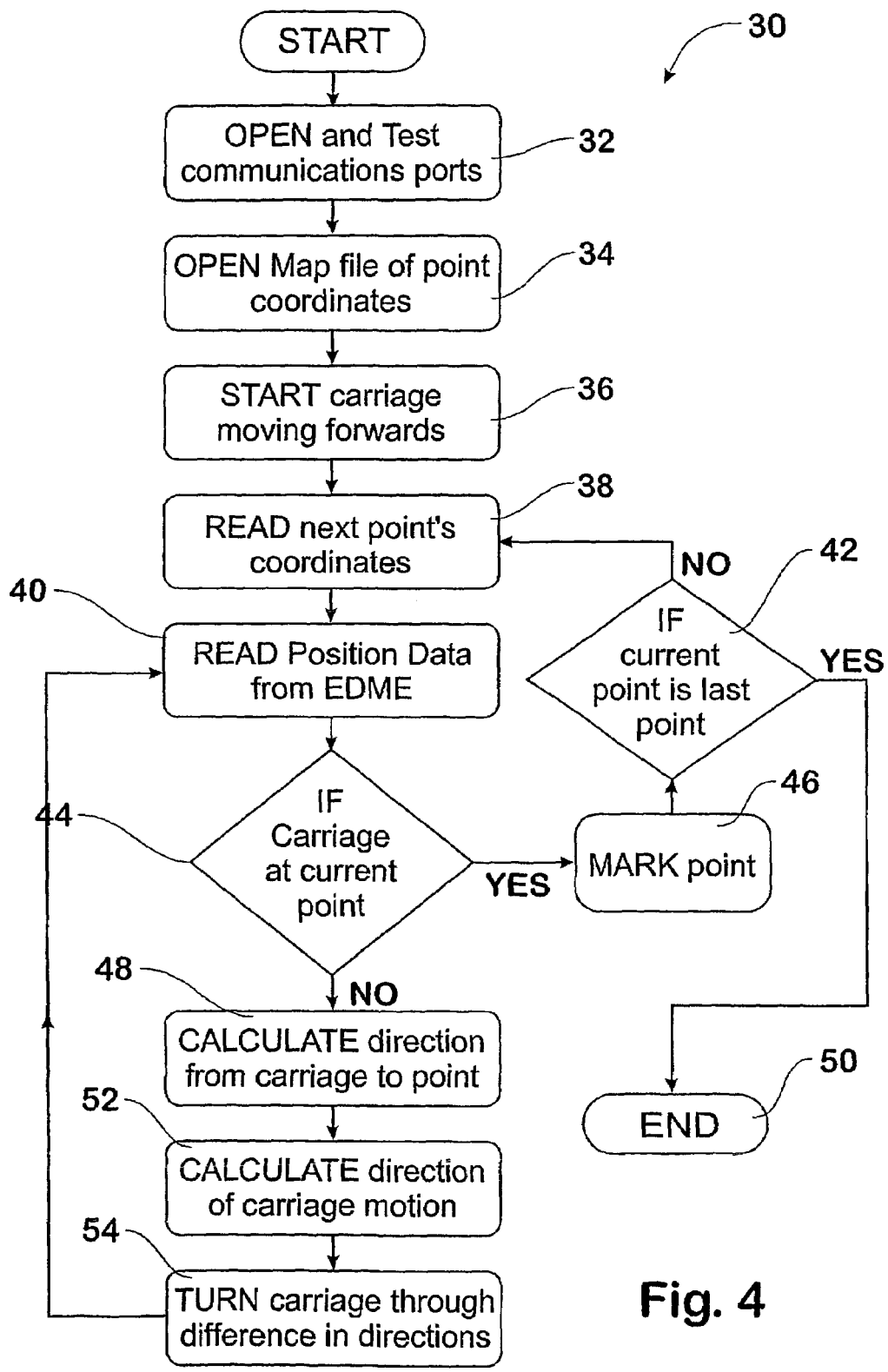
FIG. 4 is a flow chart of the steps implemented by a software product used in an embodiment of the present invention.

Referring now to FIG. 4, there is depicted a flow chart of a process 30 coded into the software product executed by the processor of computer 8 in FIG. 1. The software product contains instructions to implement each of the steps of FIG. 4 of the procedure that will now be described. It will be realised that the actual coding of the instructions is straightforward for persons skilled in this field, once the functionality of the software product is explained.

At step 32 the communication ports used by computer 8 to communicate with base station 6 and radio transmitter 11 are opened and tested.

At step 34 a pre-stored "map" file 9 (see FIG. 5) containing point coordinates defining the logo to be demarcated by carriage 1 is opened.

At step 36 a command to start the carriage moving forward is generated. The command is sent to transmitter 11 which in turn converts it to a radio frequency control signal that is transmitted to carriage 1. The carriage receives the signal by means of antenna 16, generates a corresponding baseband signal by means of receiver 15 and passes the baseband signal to control electronics module 20. The control module generates corresponding commands that are sent to drive modules 22A–22D in order to start the carriage moving forwards.

At step 38 the computer reads the next point from the map file and sets it to be the current point for processing. At step 40 the computer reads carriage position data from base station 6. At step 44 the computer compares the data read at step 38 with the data read at step 40. If the two points are not within a small distance of each other then the computer decides that the carriage is not at the point dictated by the map coordinate. Consequently, at step 48 the direction vector from the carriage to the desired map coordinate is calculated.

At step 52 the velocity vector of the carriage is calculated. At step 54 the difference between the direction vector and the velocity vector is determined in order to generate a turn command to turn the carriage so that it heads towards the map point. Control then diverts to step 40 and steps 40 to 54 are repeated until it is determined at decision point 44 that the carriage and the current map point are sufficiently close enough for it to be said that the carriage is at the current map point. If they are sufficiently close control diverts to step 46.

At step 46 a mark command is generated causing a paint drop to be dispensed through nozzle 29.

At decision point 42 the computer checks if the current point of the map file is the last point in the file. In the event that it is the last point then the procedure ends at step 50. Alternatively, control passes back to step 38 and the previous procedure is repeated until all the points of the map file have been processed.

The flow chart of FIG. 4 shows the architecture, functionality, and operation of a possible implementation of the software product. In this regard, each block represents a module, segment, or portion of code, which comprises one or more executable instructions for implementing the specified logical functions). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved.

Figure 5:
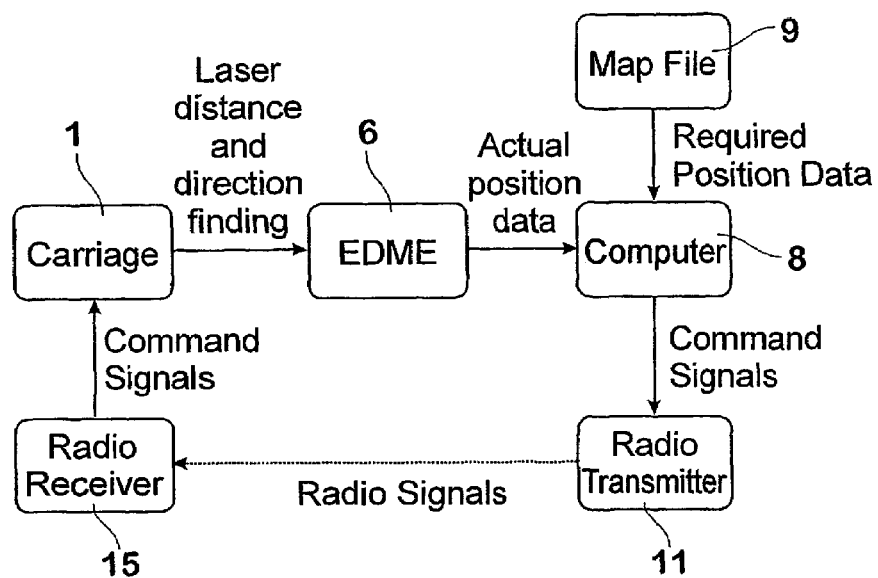
FIG. 5 is a flow chart showing the flow of data through the system of FIG. 1.

With reference to FIG. 5 there is shown a block diagram of many of the components of the previously described system showing the flow of information enabling positioning of the carriage and dispensing of paint as previously described.

Apart from turf marking, the carriage 1 may also be used as a surveying tool in which mode it is run back and forth over a surface to be surveyed. The procedure is suitably as follows:

Initially a path is defined for the carriage to follow. The path may be defined in the same way as setting a path for marking. Normally the path will consist of parallel evenly spaced lines covering the surface in question.

The carriage is then set up and commanded to follow the path.

Each time the EDM equipment sends distance data to the computer it will also send the level or height of the carriage (Z coordinate) data. These levels or heights are stored in a file along with the corresponding latitude (X coordinate) and longitude (Y coordinate) position data.

The result is a data file defining a grid or points covering the area of interest that may be up-loaded to a computer-aided design (CAD) package for use in creating a digital terrain model (DTM). It will be appreciated that this survey procedure may be conveniently employed to create a DTM for the region of a surface desired to be marked.

Although not essential to operation, feedback sensors such as shaft encoders, a compass and/or an inclinometer may be included on the carriage 1. Data from the feed back sensors may be transmitted back to computer 8 by means of an additional radio frequency (RF) link. The software program may contain instructions to process the received feedback data in order to modify the control signals transmitted thereby implementing a feedback control loop in order to minimise divergence of the carriage's path from the map coordinates.

Where an on-board computer is incorporated, the carriage guidance system may be arranged to transmit a desired direction bearing to the carriage. A processor on the carriage calculates the carriage's actual bearing as sensed by the compass and compares it to the desired bearing in order to generate commands to steer the carriage along the desired bearing. The carriage guidance system also sends the carriage signals to control speed and to dispense paint. Accordingly in this embodiment two separate computer programs work together.

While the invention has been described as making use of an electronic distance measuring apparatus in the form of a laser base station, it is possible to use other apparatus for determining the position of the carriage. For example, a global positioning system (GPS) receiver might be used, together with differential correction as required. However, GPS data is typically limited to 20 mm accuracy; whereas data derived from an EDM system as explained herein, typically achieves a minimum of 10 mm accuracy and tighter tolerances are usually achieved than is the case with GPS. Additionally, GPS may not be used indoors or in any area where the view of the sky is limited, since direct line of sight to a minimum of four GPS satellites is required for GPS to operate satisfactorily. This is a serious limitation in that it would prevent the turf marking carriage operating inside large sporting stadiums.

Accordingly, while the invention may make use of a GPS receiver in order to monitor the location of the carriage it is preferred that EDM technology of the type described herein is used.

Figure 6:
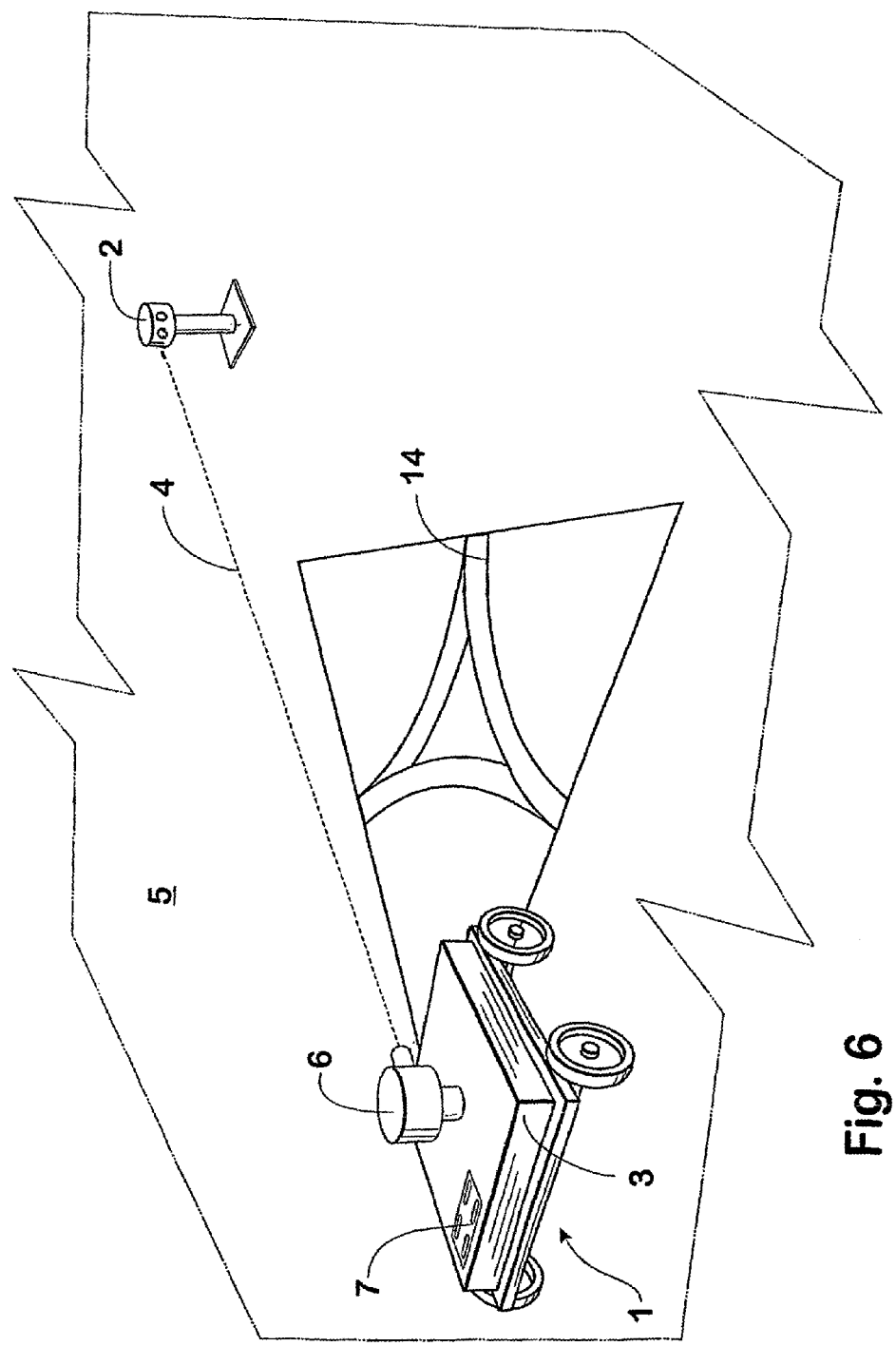
FIG. 6 depicts an automated turf-marking carriage according to a further embodiment of the present invention.

A variation of the embodiment of FIG. 1 will be explained with reference to FIG. 6. In FIG. 6 the EDM base station 6 has been mounted on carriage 1 whereas prism 2 has been fixed in the turf at a predetermined reference position. In this embodiment computer 8 is incorporated inside carriage 1. The software program executed by the computer is very similar to that explained with reference to FIG. 4 except that it includes instructions to transform the position coordinate data to take into account the transposition of the base station and reflective prism 2. A control panel 7 for entering data into the computer is mounted on cover 3 and is accessible to an operator. In this further embodiment the radio transmitter 11 and radio receiver 14 and antenna 16 are unnecessary, and so are not present. Accordingly, if the further embodiment is employed variations in the height or attitude of the EDM stations must be compensated out. It will be appreciated that use of the marking apparatus on substantially flat ground will obviate the requirement for height data.

Figure 7:
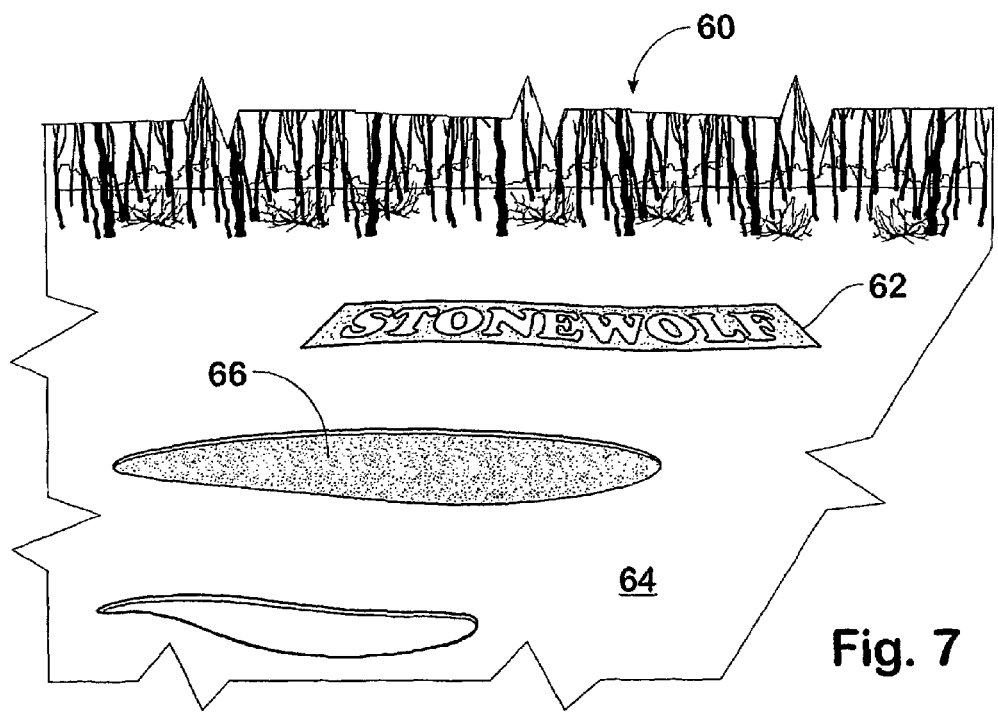
FIG. 7 depicts an undulating turfed surface upon which a sign has been marked.

In FIG. 7 there is shown a corporate logo "STONE-WOLF" 62 applied to the sloping surface of turf 64 in the vicinity of a green 66 on a golf course 60. It is anticipated that points providing an outline of the logo 62 may be automatically produced by a ground marking apparatus according to embodiment of the invention, allowing the negative image of the lettering to be in-filled by hand.

The automatic marking system of the invention allows the creation of logos which take environmental factors into account, including the undulations in the surface to receive the markings and the desired viewing positions for both audiences in attendance and television viewers. Ground slope angles can vary by up to 30%, such as in the case of golf course contours. In such circumstances, prior art methods do not provide a satisfactory result or are otherwise costly, time consuming and laborious.

It will of course be realised that the above description of marking turfed ground surfaces, such as sports fields, has been given only by way of illustrative example of the invention. All such modifications and variations thereto, as would be apparent to persons skilled in the art such as marking the surface of a car-park or roadway, are deemed to fall within the broad scope and ambit of the invention as is described herein and set out in the accompanying claims.

The invention claimed is:

1. An automatic ground marking apparatus for marking ground, the apparatus comprising:
    a carriage responsive to carriage control signals for traversing the ground, the carriage comprising a controllable steering and drive system and a controllable marking system for marking a sign on the ground;
    a position determining system comprising a laser based electronic distance measuring device, the laser based electronic distance measuring device including a base station and a reflector, which system is arranged to determine the position of the carriage; and
    a processor responsive to the position determining system and generating the carriage control signals wherein the controllable steering and drive system respond to the carriage control signals to cause the carriage to traverse the ground wherein the controllable steering and drive system further comprises a plurality of independently controllable drive units, wherein each of the independently controllable drive units is coupled to a wheel of the carriage and mark out a desired sign on the ground.

2. The automatic ground marking apparatus of claim 1, wherein the carriage control signals are transmitted to the carriage from a remote processor, and wherein the processor associates the carriage control signals with points defining the desired sign.

3. The automatic ground marking apparatus of claim 1, wherein the base station and the processor are mounted to the carriage, and the processor is connected to receive position data from the base station.

4. The automatic ground marking apparatus of claim 1, wherein the base station is fixed to the ground and wherein the reflector is mounted to the carriage.

5. The automatic ground marking apparatus of claim 4, wherein the marking apparatus further comprises:
    a radio link to relay carriage control signals to the carriage from the processor.

6. The automatic ground marking apparatus of claim 1, wherein the controllable steering and drive system further comprises:
    a compass; and
    a processing device responsive to the compass to determine an actual bearing of the carriage.

7. The automatic ground marking apparatus of claim 6 wherein the further processing apparatus compares the actual bearing with a desired bearing encoded in the carriage control signals.

8. The automatic ground marking apparatus of claim 1, wherein the controllable marking system further comprises:
    a reservoir; and
    dispensing nozzle for a marking medium.

9. The automatic ground marking apparatus of claim 8, wherein a controllable valve interconnects the reservoir and dispensing nozzle.

10. The automatic ground marking apparatus of claim 1, wherein the carriage further comprises:
    a feedback sensor arranged to provide a feedback signal to the processor.

11. The automatic ground marking apparatus of claim 1, wherein the carriage further comprises:
    an inclinometer for determining the attitude of the carriage.

12. The automatic ground marking apparatus of claim 11, wherein the inclinometer is coupled to a gimbal structure carrying a mast for a reflector and a marking means, wherein the inclinometer is arranged to maintain the mast in a vertical orientation.

* * * * *